United States Patent [19]
Mori et al.

[11] Patent Number: 5,435,794
[45] Date of Patent: Jul. 25, 1995

[54] POWER TRANSMISSION UNIT FOR ELECTRIC VEHICLE

[75] Inventors: Haruhito Mori, Kawasaki; Kunihiko Morikawa, Hiratsuka, both of Japan

[73] Assignee: Nissan Motor Co., Ltd., Yokohama, Japan

[21] Appl. No.: 337,418

[22] Filed: Nov. 7, 1994

Related U.S. Application Data

[62] Division of Ser. No. 42,571, Apr. 5, 1993, abandoned.

[30] Foreign Application Priority Data

Apr. 8, 1992 [JP] Japan .................. 4-087000
Jan. 29, 1993 [JP] Japan .................. 5-013062

[51] Int. Cl.⁶ .................................... F16H 1/32
[52] U.S. Cl. ................... 475/343; 475/338; 475/341
[58] Field of Search ................ 475/150, 338, 343

[56] References Cited

U.S. PATENT DOCUMENTS

| | | | |
|---|---|---|---|
| 810,444 | 1/1906 | Theil | 475/341 |
| 1,221,626 | 4/1917 | Tadey | 475/343 |
| 1,377,864 | 5/1921 | Walter | 475/341 |
| 1,432,090 | 10/1922 | Simpson | 475/341 |
| 1,590,528 | 6/1926 | Lansing | 475/341 |
| 2,329,604 | 9/1943 | Ginter | 475/341 |
| 2,488,660 | 11/1949 | Conkle | 475/343 |
| 2,955,487 | 10/1960 | Malley | 475/341 |
| 2,984,127 | 5/1961 | Schwenk | 475/343 |
| 3,222,954 | 12/1965 | Wuertz | 475/343 |
| 3,453,907 | 7/1969 | Noguchi et al. | 475/341 |
| 3,459,070 | 8/1969 | Holdeman | 475/343 |
| 3,686,978 | 8/1972 | Knoblach et al. | 475/340 |
| 3,705,522 | 12/1972 | Ogawa | 475/341 |
| 4,043,216 | 8/1977 | Steer | 475/341 |

OTHER PUBLICATIONS

"Hatsumei", (The Invention), vol. 89, 1992 pp. 86–89.

*Primary Examiner*—Michael Koczo
*Attorney, Agent, or Firm*—Foley & Lardner

[57] ABSTRACT

A power transmission unit for an electric vehicle has a planetary-gear type speed reducer disposed between and connected to an electric motor and a driving wheel. The speed reducer has two planetary gear sets in which common pinions are engaged with a fixed first ring gear and a second ring gear acting as an output portion. The common pinions are supported to a common carrier acting as an input portion. The number of teeth of the second ring gear is set to be the same as the sum of a number of teeth of the first ring gear and a number of the common pinions, and the common pinions are located at equal distances. Therefore, the power transmission unit has a proper reduction gear ratio and a high-torque transmission characteristic which are required for an electric vehicle while the speed reducer is formed small in size.

1 Claim, 6 Drawing Sheets

0~12000rpm —12:1→ 0~1000rpm

0~12000rpm —12:1→ 0~1000rpm

POWER TRANSMISSION UNIT FOR ELECTRIC VEHICLE

This application is a divisional of application Ser. No. 08/042,571 filed Apr. 5, 1993, abandoned.

BACKGROUND OF THE INVENTION

1. Field of the Invention

The present invention relates to improvements in a power transmission unit for an electric vehicle, and more particularly to a power transmission unit which has a suitable reduction gear ratio and a high-torque transmission characteristic.

2. Description of the Prior Art

It is well known that a variety of planetary-gear type reducers have been proposed and put into practical use. A planetary-gear type reducer is disclosed on pages 64 to 69 of a publication "Hatsumei (The Invention) VOL. 89". The disclosed planetary-gear type reducer is constituted by two planetary gear sets which have a common sun gear, common pinions and first and second ring gears. The common sun gear is connected to an input shaft, and the second ring gear is connected to an output shaft while the first ring gear is fixed. Such a conventional speed reducer produces a high-reduction gear ratio while keeping a small size. However, this type of speed reducer is not suitable for a reducer for an electric vehicle which requires a reduction gear ratio ranging from 10 to 15 and a high-torque transmitting characteristic.

On the other hand, if such a speed reducer for an electric vehicle is produced by one planetary gear set as shown in FIG. 11, it is necessary to largely decrease the number of teeth of a sun gear 101 and increase a number of teeth of a ring gear 103. This forces an increase in the diameter of this speed reducer. Also, a conventional speed reducer by two planetary gear sets is normally arranged such that an input power is transmitted in turn to an input shaft 110, a first sun gear 111, first pinions 112, a common ring gear 113, a second pinion 114 and an output carrier 115, as shown in FIG. 12. However, this speed reducer necessitates a large number of parts and increases its production cost. Furthermore, this speed reducer becomes large in size by increasing dimensions in diametrical and axial directions.

SUMMARY OF THE INVENTION

It is an object of the present invention to provide an improved power transmission for an electric vehicle which has a suitable reduction gear ratio and a high-torque transmission characteristic while keeping small in size.

According to the present invention, a power transmission unit for an electric vehicle comprises an electric motor and a driving wheel between which a speed reducer is disposed. The speed reducer comprises a first ring gear which is fixed to a casing of the motor, a carrier which is drivingly connected to the electric motor, a plurality of common pinions which are rotatably supported to the carrier and engaged with the first ring gear, and a second ring gear which is engaged with the common pinions and fixedly connected to the driving wheel.

Further, according to the present invention, a power transmission unit for an electric vehicle comprises an electric motor, a drive wheel and a speed reducer. The speed reducer comprises a common ring gear which is connected to the electric motor, first pinions which are engaged with said common ring gear, second pinions which are engaged with the common ring gear, a first sun gear which is engaged with the first pinions, a second sun gear which is engaged with the second pinions and integrally connected with the first sun gear, a first carrier which supports the first pinions and is drivingly connected to the drive wheel, and a second carrier which supports the second pinions and is fixed to the case of the motor.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 4, there is shown a first embodiment of a power transmission unit P for an electric vehicle according to the present invention.

Figure 1:
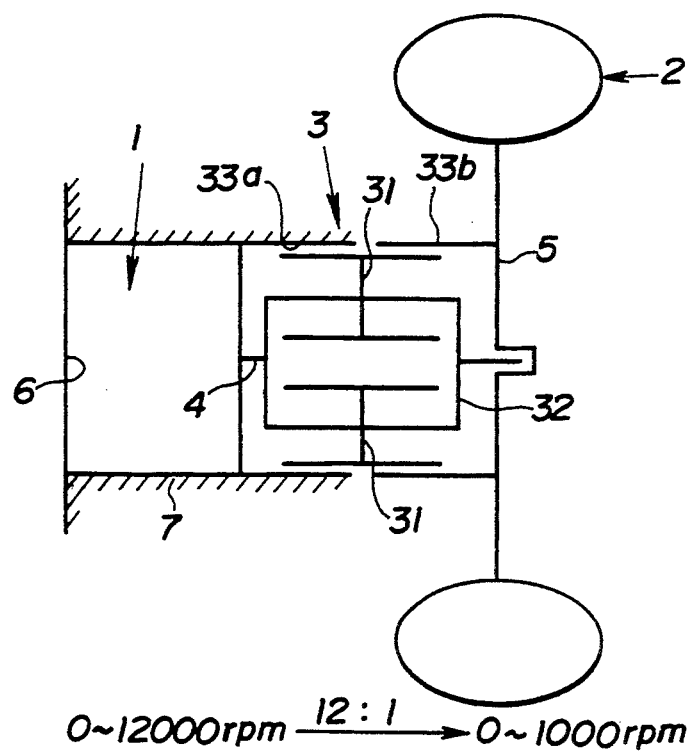
FIG. 1 is a schematic view of a first embodiment of a planetary-gear type reducer of a power transmission unit for an electric vehicle according to the present invention.
Figure 2:
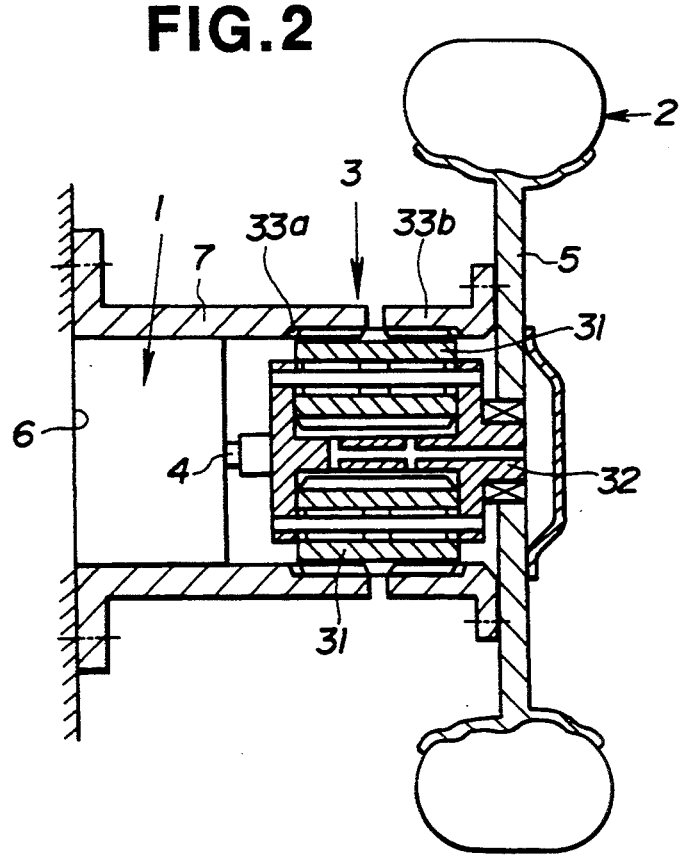
FIG. 2 is a cross-sectional view of the first embodiment of FIG. 1.

As shown in FIG. 1, an electric motor 1 is fixedly connected to a vehicle body 6 of the electric vehicle. A shaft 4 of the electric motor 1 is directly connected to an input portion of a first planetary-gear type reducer 3 which is disposed between the electric motor 1 and a driving wheel 2. An output portion of the first planetary-gear type reducer 3 is directly connected to a load wheel 5 of the driving wheel 2.

The first planetary-gear type reducer 3 comprises two planetary gear sets whose pinions and carrier are four common pinions 31 and a common carrier 32, respectively. First and second ring gears 33a and 33b are engaged with the common pinions 31. The first ring gear 33a is fixed to a case 7 which is fixedly connected to the vehicle body 6. In these planetary gear sets, a sun gear is omitted. The common carrier 32 functions as an input portion of the first planetary-gear type reducer 3. The second ring gear 33b functions as an output portion of the first planetary-gear type reducer 3.

Figure 3:
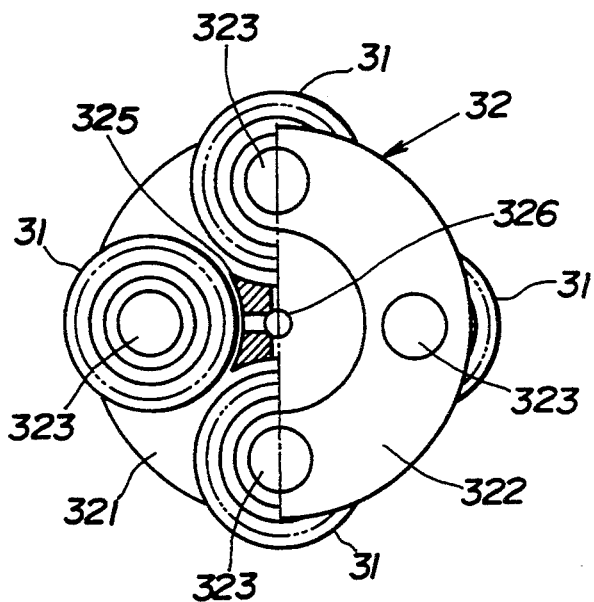
FIG. 3 is a plan view, partially in section, of a carrier applied to the first embodiment of FIG. 1.

As shown in FIG. 3, the common carrier 32 is provided with a front plate 321 and a rear plate 322 which are supported by a plurality of pinion supporting pins 323. A connecting member 325 connects the front and rear plates 321 and 322 at their center portions. The connecting member 325 has an oil hole 326 through which lubricating oil is supplied for lubricating the first planetary-gear type reducer 3.

Figure 4:
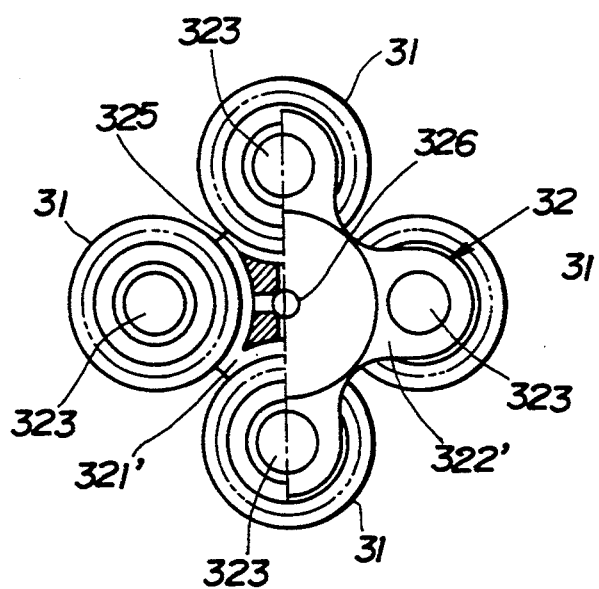
FIG. 4 is a plan view, partially in section, of another carrier applicable to the first embodiment of FIG. 1.

It is preferable that the front and rear plates 321 and 322 are formed generally in a cross-shape, as shown in FIG. 4. Such plates will contribute to decrease the weight of the first; planetary-gear type reducer 3.

It is possible to arrange the number n of the common pinions 31 in the first planetary-gear type reducer 3 by designing the number $Z_{R2}$ of the teeth of the second ring gear 33b to be larger than the number $Z_{R1}$ of teeth of the first ring gear 33a by the number n. In this embodiment, the number n is set at four. Accordingly, four common pinions 31 are arranged in the first planetary-gear type reducer 3.

The manner of operation of thus arranged power transmission unit according to the present invention will be discussed hereinafter.

When the rotation of the electric motor 1 is inputted to a common carrier 32 of the first planetary-gear type reducer 3 through the shaft 4, the common carrier 32 is rotated, and thus the common pinions 31 are revolved along the first ring gear 33a and generate their rotation on their respective axes. The revolution and rotation of the common pinions 31 generate a reduction rotation of the second ring gear 33b. The reduction rotation of the second ring gear 33b is transmitted to the driving wheel 2 through the road wheel 5.

For example, assuming that the reduction gear ratio i of the first planetary-gear type reducer 3 is set to 12 (i=12), when the rotation of the motor 1 changes from 0 to 12000 rpm, the rotation of the driving wheel 2 proportionally changes from 0 to 1000 rpm.

Although the power transmission unit P according to the present invention has only one reduction gear ratio, it is sufficient to reduce the normal rotation speed of the electric motor 1 such that its reduction gear ratio i is ranging from 10 to 15 (i=10-15). Because this power transmission unit P is applied to the electric vehicle which uses the electric motor 1 changing its rotation speed by controlling its applied electric current or voltage value.

In this embodiment, assuming that a gear ratio between a number $Z_S$ of teeth of a sun gear and a number $Z_{R1}$ of teeth of the first ring gear is $\alpha_1$ ($\alpha_1 = Z_S/Z_{R1}$), and a gear ratio between the number $Z_S$ of the teeth of the sun gear and a number $Z_{R2}$ of the teeth of the second ring gear is $\alpha_2$ ($\alpha_2 = Z_S/Z_{R2}$), the reduction gear ratio i of the first planetary-gear type reducer 3 is represented as follows:

$$i = \alpha_1/(\alpha_1 - \alpha_2) = Z_{R2}/(Z_{R2} - Z_{R1}) \quad (1)$$

Since the common pinions 31 should be arranged to be engaged with the first and second ring gears 33a and 33b, it is necessary that the common pinions 31 are located so as to correspond to the first and second ring gears 33a and 33b. Accordingly, it is preferable that the common pinions 31 are circumferentially arranged at equal distances, and it is necessary to satisfy the following limitations:

$$(Z_S + Z_{R1})/n = \text{Integer} \quad (2)$$

$$(Z_S + Z_{R2})/n = \text{Integer} \quad (3)$$

wherein n is a number of the common pinions 31.

If the number $Z_{R2}$ of the teeth of the second ring gear 33b is set to be the same as the sum of the number $Z_{R1}$ of the teeth of the first ring gear 33a and the number n of the common pinions 31, that is, as follows:

$$Z_{R2} = Z_{R1} + n \quad (4)$$

the above limitations are satisfied, and it becomes possible to arrange the common pinions 31 at equal distances.

By substituting the equation (4) to the equation (1), the following equation is obtained:

$$i = (Z_{R1} + n)/n \quad (5)$$

In this embodiment, the number $Z_{R1}$ of the teeth of the first ring gear 33a is set to 44 ($Z_{R1}=44$), and the number $Z_{R2}$ of the teeth of the second ring gear 33b is set to 48 ($Z_{R2}=48$). Further, the number n of the common pinions 31 is set to 4 (n=4). Accordingly, with this arrangement, the first planetary-gear type reducer 3 has characteristics to transmit a high torque, to set the reduction gear ratio i to 12 (i=12), and to arrange the four common pinions 31 at equal distances.

It will be understood that the reduction gear ratio i may be determined so as to be a ratio ranging from 10 to 15 (i=10-15) which is required to a speed reducer of an electric vehicle. For example, in order to obtain i=15, the following limitations may be satisfied. That is, the number $Z_{R1}$ of the teeth of the first ring gear 33a is set to 41 ($Z_{R1}=41$), the number $Z_{R2}$ of the teeth of the second ring gear 33b is set to 44, and the number n of the pinions is 3 (n=3).

As clear from the equations (1) and (5), the reduction gear ratio i is not affected by the number $Z_S$ of the teeth of a common sun gear. Accordingly, it is clear that the common sun gear may be omitted from a reducer of this type. Therefore, in this embodiment, the common sun gear is omitted from the first planetary-gear type reducer 3.

The lubrication of the first planetary-gear type reducer 3 is implemented in such a manner that lubricating oil from the lubrication hole 326 is splashed to the common pinions 31 according to the rotation of the carrier 32. The lubricating oil is also supplied to engaging portions between the both ring gears 33a and 33b and the common pinions 31. Accordingly, the raising of temperature at engaging portions is suppressed by this lubrication.

With the thus arranged power transmission unit P, the following effects are obtained:

(a) Since the first planetary-gear type reducer 3, which is disposed between the electric motor 1 and the driving wheel 2, is formed by two planetary gear sets which are provided with the common pinions 31, the common carrier 32 and the first and second ring gears 33a and 33b separated with each other while omitting a sun gear, there is provided a power transmission unit P for an electric vehicle which satisfies a high-torque transmission characteristic and a proper speed reduction characteristic while the first planetary-gear type reducer 3 becomes small.

(b) Since a sun gear is omitted and the connecting member 325 is disposed at a portion where the sun gear should have been disposed, in order to connect the front and rear plates 321 and 322 of the common carrier 32, the power transmission unit P is formed in a compacted size while decreasing its weight.

(c) Since the first planetary-gear type reducer 3 has the hole 326 for lubrication at the connecting member 325, lubricating and cooling characteristics are improved.

(d) Since the number $Z_{R2}$ of the teeth of the second ring gear 33b is set to the sum of the number $Z_{R1}$ of the teeth of the first ring gear 33a and n number of the common pinions 31 ($Z_{R2}=Z_{R1}+n$) while the common pinions 31 are disposed at equal distances, a balance of the engaging force among the gears is kept good while suppressing vibrations. Accordingly, the power transmission unit P performs a preferred torque transmission characteristic.

(e) Since the power transmission unit P is independently arranged to each wheel due to a small-size of the speed reducer 3, a space for passengers or batteries is increased, and a further fine control is realized by its independent control.

Figure 5:
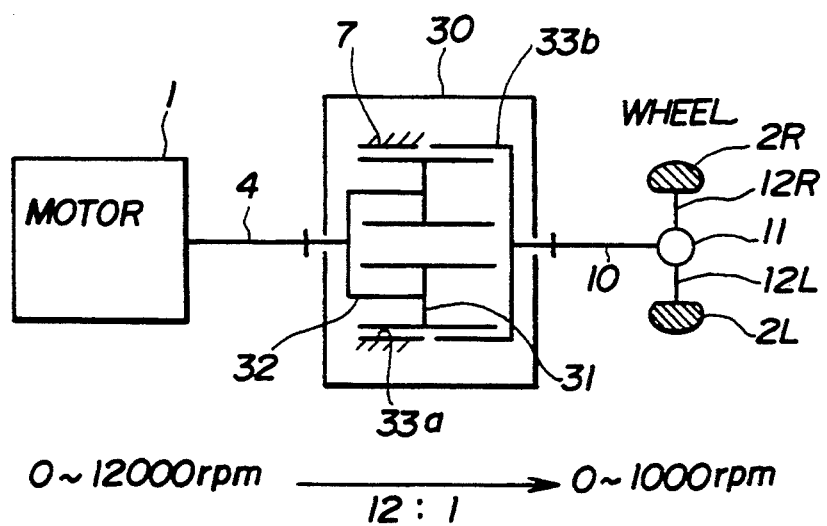
FIG. 5 is a schematic view of a second embodiment of the planetary-gear type reducer of the power transmission unit according to the present invention.
Figure 6:
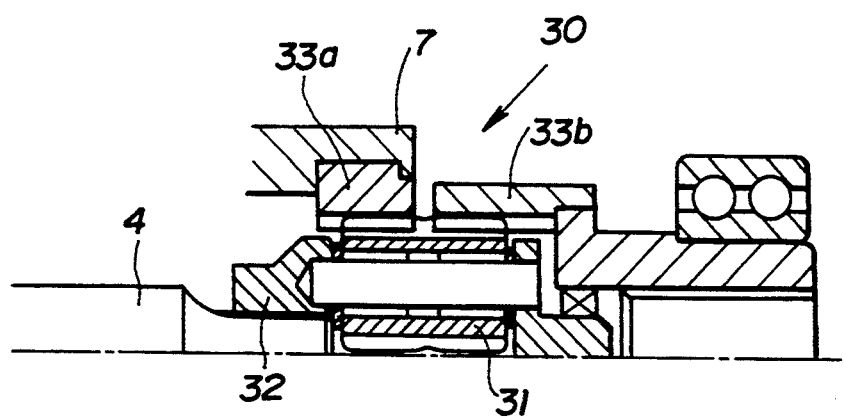
FIG. 6 is a partial cross-sectional view of the second embodiment of FIG. 5.

Referring to FIGS. 5 and 6, there is shown a second embodiment of the power transmission unit P for the electric vehicle. This second embodiment is an example which is applied to a power transmission unit for controlling a torque and a rotation speed of right and left driving wheels 2R and 2L. Basically, the first and second planetary-gear type reducers 3 and 30 are the same in structure.

As shown in FIG. 5, a second planetary-gear type reducer 30 is disposed between an electric motor 1 and the right and left driving wheels 2R and 2L. An input portion of the second planetary-gear type reducer 20 is directly connected to a shaft 4 of the electric motor 1, and an output portion of the second planetary-gear type reducer 20 is connected to the right and left driving wheels 2R and 2L through a propeller shaft 10, a differential gear 11 and right and left drive shafts 12R and 12L.

The second planetary-gear type reducer 20 is constituted by two planetary gear sets as generally similar to that of the first planetary-gear type reducer 3 except that three common pinions 31 are engaged with the first and second ring gears 33a and 33b. Since the other structure of the planetary-gear type reducer 20 of the second embodiment is the same as that of the first embodiment, such corresponding parts are designated by the same numerals of the first embodiment, and their explanations will be omitted.

The reduction gear ratio i of the second planetary-gear type reducer 20 is obtained from the equations (1) and (5) as similar to that of the first planetary-gear type reducer 3. In this embodiment, the number $Z_{R1}$ of the teeth of the first ring gear 33a is set to 33, the number $Z_{R2}$ of the teeth of the second ring gear 33b is set to 36, and the number of the common pinions 31 is set to 3. Accordingly, the second planetary-gear type reducer 20 is arranged such that the reduction gear ratio i becomes 12 (i=12) and the three common pinions 31 are arranged at equal distances.

Figure 7:
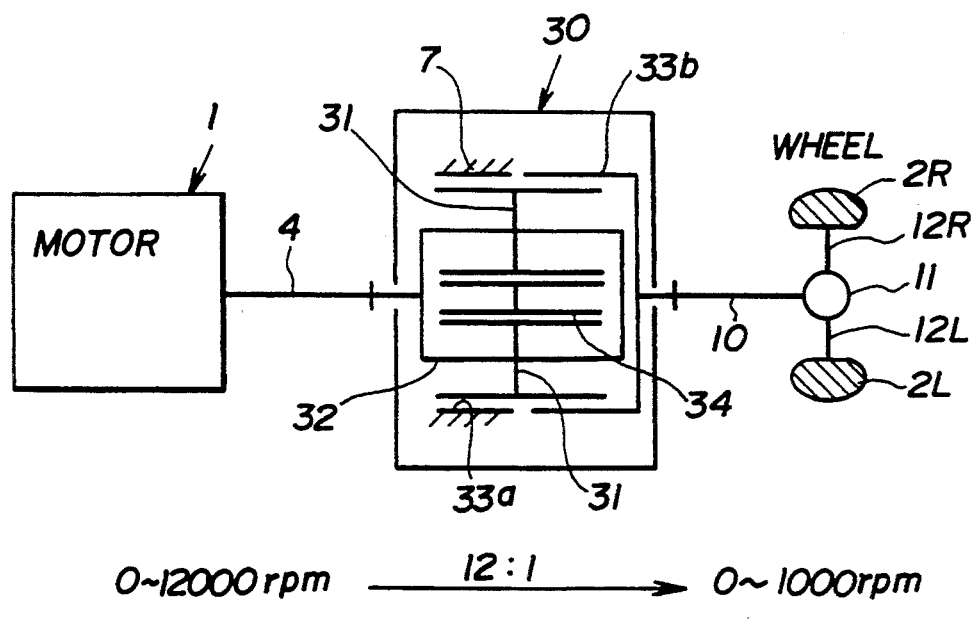
FIG. 7 is a schematic view of a third embodiment of the planetary-gear type reducer of the power transmission unit according to the present invention.
Figure 8:
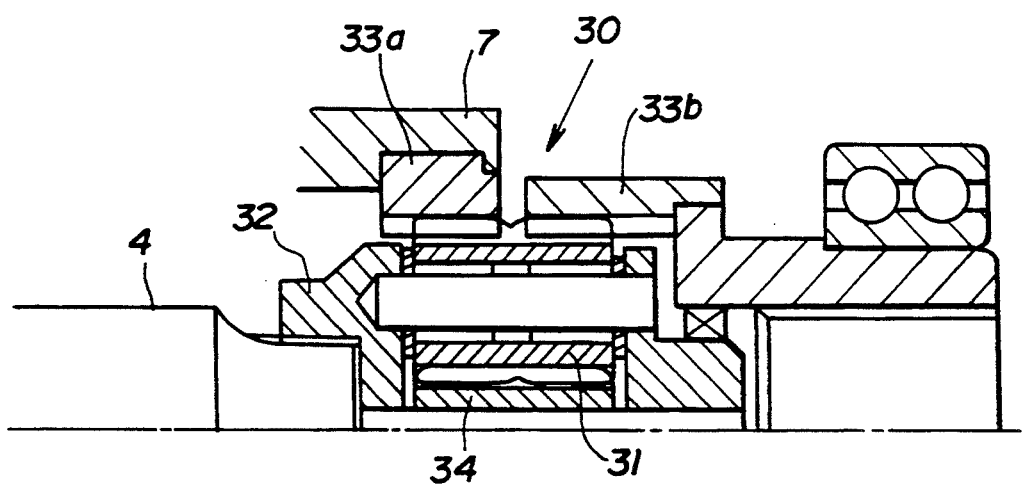
FIG. 8 is a partial cross-sectional view of the third embodiment of FIG. 7.

Referring to FIGS. 7 and 8, there is shown a third embodiment of the power transmission unit P for the electric vehicle. This embodiment is an example which is applied to a power transmission unit P for controlling a torque and a rotation speed of right and left drive wheels 2R and 2L.

As shown in FIG. 7, a third planetary-gear type reducer 30 is disposed between an electric motor 1 and the right and left driving wheels 2R and 2L. An input portion of the third planetary-gear type reducer 30 is directly connected to a shaft 4 of the electric motor 1, and an output portion of the third planetary-gear type reducer 30 is connected to the right and left driving wheels 2R and 2L through a propeller shaft 10, a differential gear 11 and right and left drive shaft 12R and 12L.

The third planetary-gear type reducer 30 is constituted by two planetary gear sets as similar to that of the first planetary-gear type reducer 3. In this third embodiment, a common sun gear 34 is arranged to engage with common pinions 31. Since the other structure of the second embodiment i is the same as that of the first embodiment, such corresponding parts are designated by the same numerals of the first embodiment, and their explanations will be omitted.

The manner of operation of the thus arranged power transmission unit P will be discussed hereinafter.

The reduction gear ratio of the third planetary-gear type reducer 30 is obtained from the equations (1) and (5) as similar to that of the first planetary-gear type reducer 3. Accordingly, the operational difference between the first and third embodiments is a difference caused by the common sun,gear 34. That is to say, the existence of the common sun gear 34 facts to suppress inward bending of the common pinions 31 under a high-torque transmitting operation. Additionally, this enables the common carrier 32 to support the common pinions 31 at only one side plate (by a cantilever support).

Since the reduction gear ratio i is determined independently from the number $Z_S$ of the teeth of the common sun gear 34 as is clear from the equations (1) and (5), there is no problem to set the diameter of the common sun gear 34 into a sufficiently small size in case that a sun gear is used in the third planetary-gear type reducer 30. Accordingly, the third planetary-gear type reducer 30 can keep a compact size.

With the thus arranged power transmission unit P, the following merits are obtained in addition to the merits (a) and (d) of the first embodiment:

(f) Since the third planetary-gear type reducer 30 is provided with the common sun gear 34 so as to engage with the common pinions 31, the rigidity of the gears under engagement is increased and therefore the noise due to the gear engagement is suppressed at a low level.

Although in this embodiment the common sun gear 34 has been shown and described to suppress such gear engagement noise, it will be understood that such noise is suppressed even if separately formed two sun gears are used in this reducer.

Figure 9:
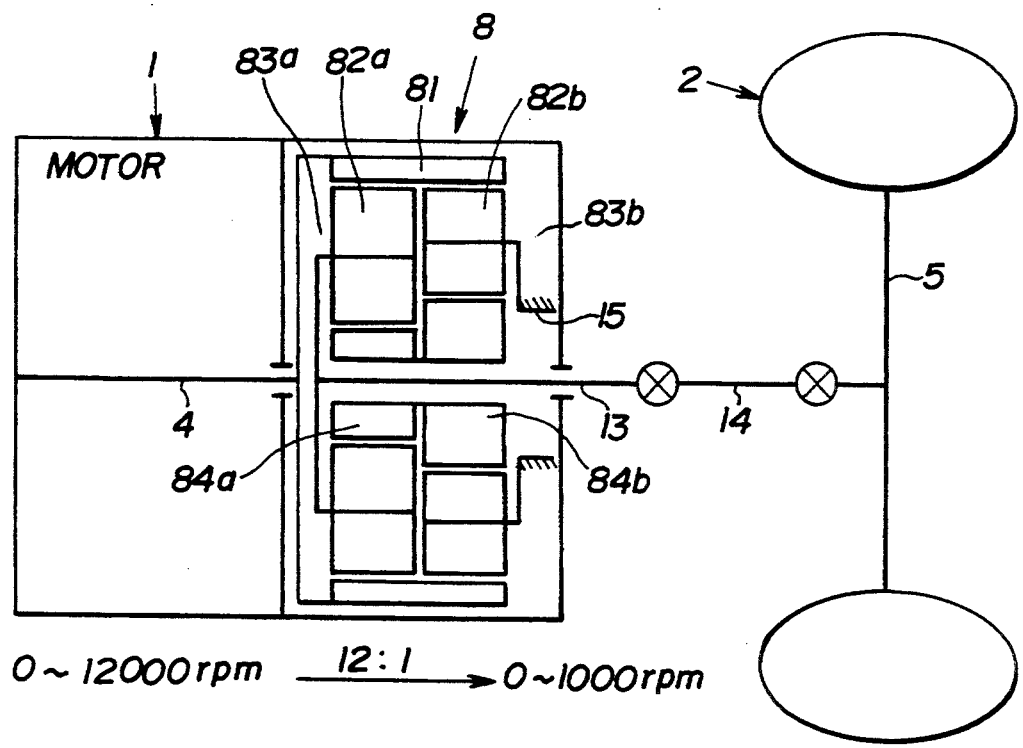
FIG. 9 is a schematic view of a fourth embodiment of the planetary-gear type reducer of the power transmission unit according to the present invention.
Figure 10:
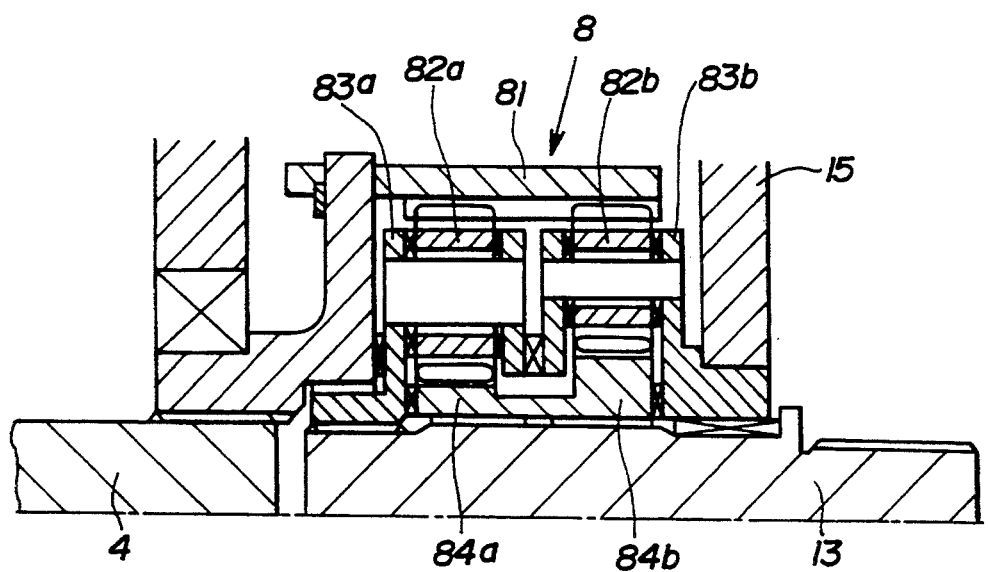
FIG. 10 is a partial cross-sectional view of the fourth embodiment of FIG. 9.
Figure 11:
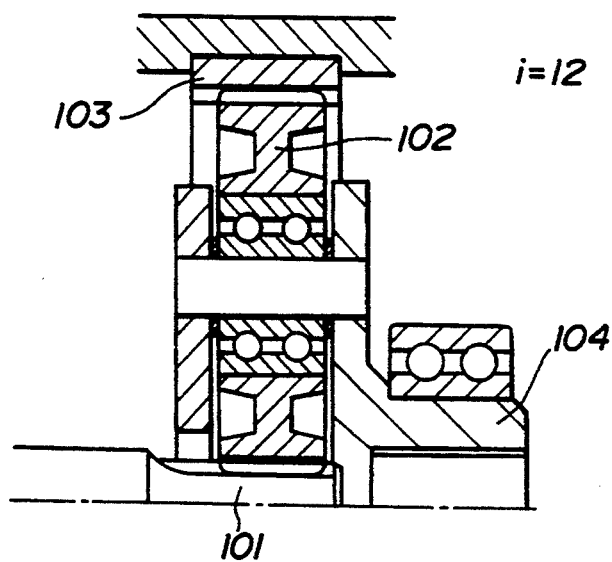
FIG. 11 is a cross-sectional view of a conventional planetary-gear type reducer.
Figure 12:
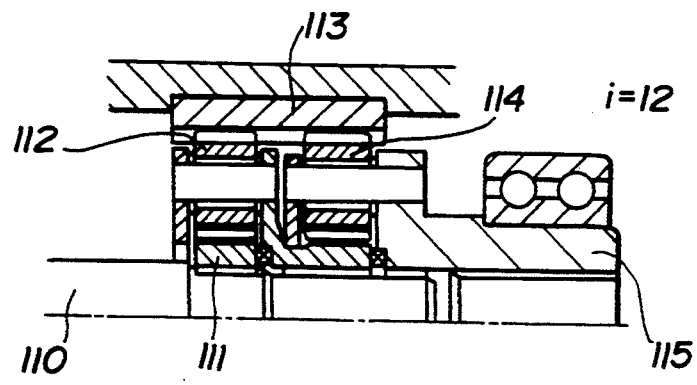
FIG. 12 is a cross-sectional view of another conventional planetary-gear type reducer.

Referring to FIGS. 9 and 10, there is shown a fourth embodiment of the power transmission unit P according to the present invention. This fourth embodiment is an example which is applied to a power transmission unit P for independently controlling each driving wheel in torque and rotation speed.

As shown in FIG. 9, a fourth planetary-gear type reducer 8 is disposed between an electric motor 1 and a driving wheel 2. An input portion of the fourth planetary-gear type reducer 8 is directly connected to a shaft 4 of the electric motor 1, and an output portion of the fourth planetary-gear type reducer 8 is connected to the driving wheel 2 through an output shaft 13, a drive shaft 14 and a road wheel 5. The fourth planetary-gear type reducer 8 is constituted by two planetary gear sets which comprises a common ring gear 81, first and second pinions 82a and 82b, first and second sun gear 84a and 84b. The second carrier 83b is fixed to a case 15. The common ring gear 81 acts as an input portion of the fourth planetary-gear type reducer 8, and the first carrier 83a acts as an output portion of the fourth planetary-gear type reducer 8.

The manner of operation of the thus arranged power transmission unit P of the fourth embodiment will be discussed hereinafter.

When the rotation of the electric motor 1 is inputted to the common ring gear 81, the second pinions 82b which are supported to the second carrier 83b fixed to the case 15 are rotated at a fixed position without revolution around the second sun gear 84b and rotate the second sun gear 84b. The first pinions 82a are rotated on their respective axes and revolved around the first sun gear 83a due to the rotations of the common ring gear 81 and the first sun gear 84a integral with the second sun gear 84b. The first carrier 83a which supports the first pinions 82a and the output shaft 13 which is interconnected to the first carrier 83a are rotated while decreasing rotating speed. Therefore, the driving wheel 2 is rotated through the drive shaft 14 by the rotation of the output shaft 13 and realizes preset reduction gear ratio i.

In this embodiment, assuming that a gear ratio between a number $Z_{S1}$ of the teeth of the first sun gear 84a and a number $Z_R$ of the teeth of the common ring gear 81 is $\alpha_1$ ($\alpha_1 = Z_{S1}/Z_R$), and a gear ratio between a number $Z_{S2}$ of the teeth of the second sun gear 84b and the number $Z_R$ of the teeth of the common ring gear 81 is $\alpha_2$ ($\alpha_2 = Z_{S2}/Z_R$), the reduction gear ratio i of the fourth planetary-gear type reducer 8 is represented as follows:

$$\begin{aligned} i &= \alpha_2(1 + \alpha_1)/(\alpha_2 - \alpha_1) \\ &= Z_{S2}(Z_R + Z_{S1})/Z_R(Z_{S2} - Z_{S1}) \end{aligned} \quad (6)$$

In this embodiment, the number $Z_R$ of the teeth of the common ring gear 81 is set to 68 ($Z_R = 68$), the number $Z_{S2}$ of the teeth of the second sun gear 83b is set to 40 ($Z_{S2} = 40$), and the number $Z_{S1}$ of the teeth of the first sun gear 83a is set to 35 ($Z_{S1} = 35$). Accordingly, the fourth planetary-gear type reducer 8 is arranged so as to enable a transmission of a high torque and so as to set the reduction gear ratio i to 12.1 (i=12.1).

Furthermore, it is possible to set a reduction gear ratio i to an extremely large ratio, such as to infinity $\infty$ in such a manner to minimize the difference between the number $Z_{S1}$ of the teeth of the first sun gear 84a and the number $Z_{S2}$ of the second sun gear 84b while keeping a condition $\alpha_2 > \alpha_1$.

With the thus arranged power transmission unit P, the following merits are obtained:

(g) The fourth planetary-gear type reducer 8 is formed by two planetary gear sets where the common ring gear 81 is engaged with the first pinions 82a and the second pinions 82b, and the first and second carriers 83a and 83b are integrally connected to the first and second pinions 82a and 82b, respectively. Further, the second carrier 83b is fixedly connected to the case 15, and the common ring gear 81 acts as an input portion while the first pinions 82a acts as an output portion. Accordingly, the fourth planetary gear reducer 8 has a high-torque transmission characteristics and a proper reduction gear ration while becomes small in size.

(h) Since the fourth planetary-gear type reducer 8 is arranged to enable the reduction gear ratio to freely design to infinity $\infty$ by properly setting the number $Z_{S1}$ of the teeth of the first sun gear and the number $Z_{S2}$ of the teeth of the second sun gear, the fourth planetary-gear type reducer 8 is freely applied to the various requirements of a torque transmission characteristics and a reduction gear ratio.

While the present invention has been particularly shown and described with reference to preferred embodiments thereof, if will be understood that by those skilled in the art that the foregoing and other changes in form and details can be made therein without departing from the spirit and scope of the invention.

What is claimed is:

1. A power transmission unit for an electric vehicle, comprising:
   an electric motor;
   a drive wheel;
   a speed reducer comprising;
      a common ring gear drivingly connected to said electric motor;
      first pinions engaged with said common ring gear;
      second pinions engaged with said common ring gear;
      a first sun gear engaged with said first pinions;
      a second sun gear engaged with said second pinions and integrally connected with said first sun gear;
      a first carrier supporting said first pinions and drivingly connected to said drive wheel;
      a second carrier supporting said second pinions and fixed to a casing of said motor.

* * * * *